United States Patent [19]
Osborne

[11] 3,832,017
[45] Aug. 27, 1974

[54] BRAKING SYSTEMS FOR VEHICLES

[75] Inventor: Duncan William Osborne, Leamington SpA, England

[73] Assignee: Automotive Products Limited, Leamington SpA, England

[22] Filed: Mar. 19, 1971

[21] Appl. No.: 126,126

[30] Foreign Application Priority Data
Mar. 20, 1970  Great Britain.................. 13496/70

[52] U.S. Cl............................ 303/68, 303/9, 303/10
[51] Int. Cl............................................. B60t 15/02
[58] Field of Search.......... 303/68, 2, 9, 5, 6 M, 50, 303/13, 52, 7, 40, 10, 11, 80; 188/106, 167, 170; 137/625.69, 596

[56] References Cited
UNITED STATES PATENTS
| | | | |
|---|---|---|---|
| 3,224,815 | 12/1965 | Horowitz | 303/50 |
| 3,410,610 | 11/1968 | Cumming | 303/80 |
| 3,504,946 | 4/1970 | Valentine et al. | 303/68 |
| 3,526,089 | 9/1970 | Fulmer | 303/52 |
| 3,526,440 | 9/1970 | Blair | 303/52 |

Primary Examiner—Duane A. Reger
Assistant Examiner—D. C. Butler

[57] ABSTRACT

A brake application control unit for a vehicle braking system including a source of fluid pressure at which fluid pressure is constantly available when the vehicle is in operation to supply fluid pressure for normal operation of the brakes, and means providing a constantly acting force tending to apply the same or other brakes on wheels of the vehicle, the brake application control unit including a valve which normally provides a connection between the fluid pressure source and a cylinder in which fluid pressure acts to oppose the constantly acting applying force and so prevent application of the brakes by said force, the valve being manually operable to allow escape of fluid from the pressure responsive device and thereby enable the brakes to be applied by the said force.

2 Claims, 3 Drawing Figures

BRAKING SYSTEMS FOR VEHICLES

This invention relates to braking systems for vehicles in which brakes are normally applied by fluid pressure in a fluid pressure system including a source at which fluid pressure is constantly available, the said fluid pressure being directed to motor cylinders to apply the brakes by operation of a control valve, and in which means other than the said fluid pressure are provided to apply the same or other brakes on the vehicle.

It is the object of the invention to provide improved means for controlling the application of the vehicle brakes by the said other means.

According to the invention there is provided a vehicle braking system including a source of fluid pressure at which fluid pressure is constantly available when the vehicle is in operation, at least one motor cylinder operable by pressure from said source to apply brakes on at least one wheel of the vehicle, control valve means for connecting the said source of pressure to the motor cylinder when application of the brakes is required, and means providing a constantly acting force tending to apply the same or other brakes on wheels of the vehicle, wherein there is provided a brake application control unit including a valve normally providing a fluid pressure connection between the said source and a pressure responsive device acting to apply a load opposing said constantly acting applying force said valve being manually operable to allow escape of fluid from said pressure responsive device and thereby enable the brakes to be applied by the constantly acting applying force.

Preferably, a fluid pressure storage device is provided in association with said brake application control unit, the stored pressure in which is available to operate the pressure responsive device when no pressure from the pressure source is available.

Further, according to the invention, there is provided a brake application control unit for a brake of a vehicle which brake is normally held released against the action of a constantly acting applying force by fluid pressure from a source employed for application of the same brake or other brakes at the will of an operator, the said unit comprising a first valve normally held by fluid pressure from said source in a position to admit fluid pressure from said source to a fluid pressure responsive device to oppose said constantly acting applying force and prevent application of the brakes thereby, and a second valve manually operable to allow escape of fluid pressure from said fluid pressure responsive device and thereby enable the brakes to be applied by said constantly acting applying force.

The said unit may include a fluid pressure storage device to store fluid pressure supplied by said fluid pressure source, the stored pressure being available to operate the pressure responsive device when no pressure from the pressure source is available. The constantly acting applying force may be provided by at least one spring.

The first valve may comprise a plunger movable between positions in which it respectively connects a fluid passage leading to the fluid pressure responsive device to a fluid passage leading to the source of fluid pressure and to a fluid passage leading to a drain, the said plunger being urged towards the first-mentioned position by fluid pressure from said source against the action of a spring and towards the second-mentioned position by the spring.

The second valve may be provided in the fluid passage leading to the fluid pressure responsive device, the said second valve including a plunger urged by a spring to a position in which said fluid passage is uninterrupted and manually movable to a position in which it interrupts said passge and connects the fluid pressure responsive device to the drain.

Two arrangements of braking systems according to the invention, and a brake application control unit according to the invention will now be described by way of example with reference to the accompanying drawings, in which.

Figure 1:
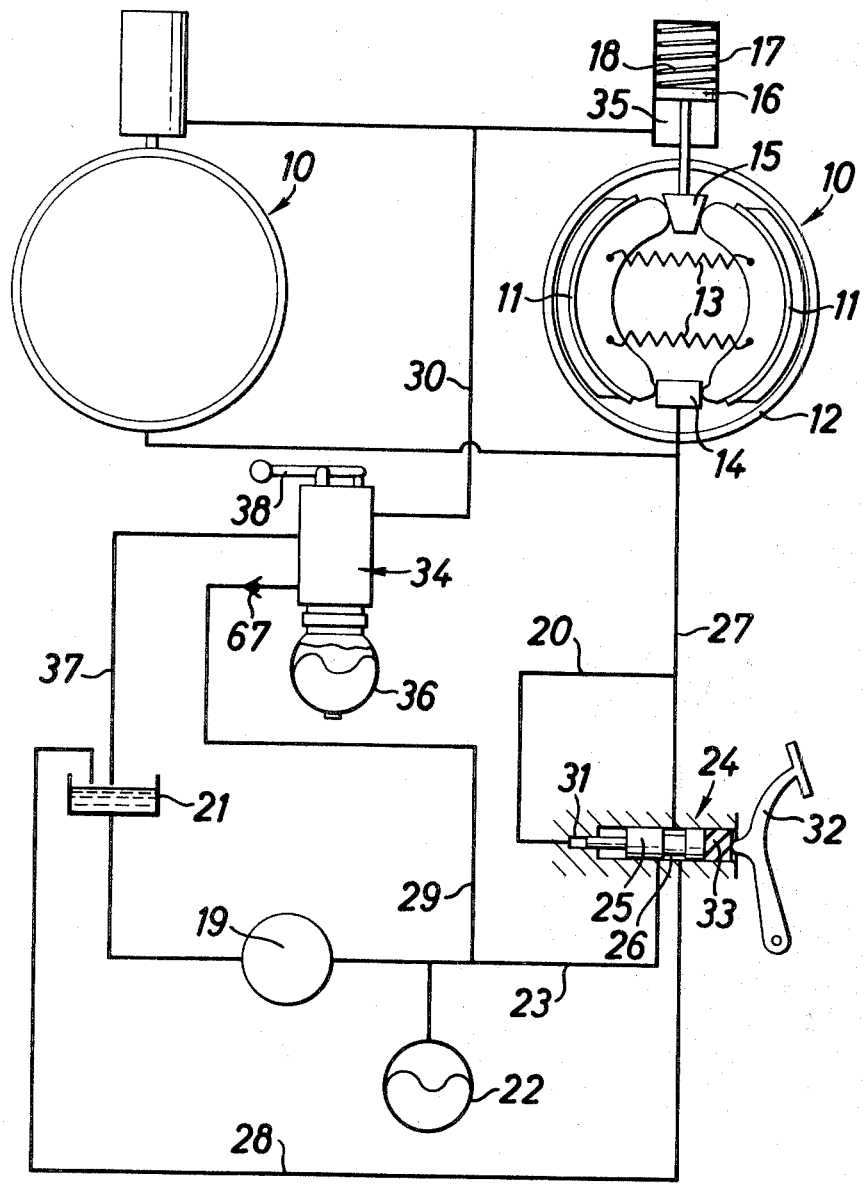
FIG. 1 is a diagram showing one arrangement of a braking system according to the invention.

Referring to FIG. 1, there are shown two internal shoe drum brakes 10 which may be mounted one on each of a pair of wheels of a vehicle, each brake including two shoes 11 (shown only on the right-hand brake), normally held in positions retracted from a surrounding drum 12 by pull-off springs 13. A liquid pressure wheel cylinder 14 mounted between one pair of adjacent ends of the shoes 11 is arranged to receive liquid pressure, as will be hereinafter described to expand the said shoes into contact with the drum, and a wedge 15 mounted between the other pair of adjacent ends of the brake shoes is coupled to a plunger 16, mounted in a cylinder 17, and acted on by a spring 18 tending to urge the said wedge in a direction to expand the shoes into contact with the drum.

Liquid pressure wheel cylinders, and wedge-type brake shoe expanders, are well known, and it is not deemed necessary to describe them in detail herein.

A pump 19 conveniently driven by the engine of a vehicle on which the braking system is mounted, and arranged to be in operation at all times when the vehicle is in use, draws liquid from a reservoir 21 and delivers liquid under pressure to a liquid pressure accumulator 22, the usual cut-out valve (not shown) being provided to enable liquid delivered by the pump to return idly to the reservoir when the pressure in the accumulator 22 has reached a predetermined value and no liquid is being used to apply the brakes.

The pump 19 and accumulator 22 are connected by a conduit 23 to driver-operated valve 24, a plunger 25 of which normally closes the said conduit 23 whilst a circumferential groove 26 in the said plunger connects a conduit 27 leading to the wheel cylinders 14 to a conduit 28 leading to the reservoir 21. A branch conduit 20, leading from the conduit 27 leads into a chamber 31 in which the liquid pressure acts on a reduced end portion of the plunger 25 to urge it towards the position shown in the drawing, thus providing a reaction force on the pedal proportional to the pressure acting in the wheel cylinders 14. Thrust exerted on a pedal 32 acts through a resilient pad 33 on the plunger 25 to move it to the left in FIG. 1, to isolate the conduit 27 from the conduit 28 and connect the said conduit 27 to the conduit 23 through the groove 26, thus transmitting liquid pressure to the wheel cylinders 14 to apply the brakes 10.

The pad 33, due to the fact that it yields under pressure, results in a greater movement of the pedal for a given change of braking force, and facilitates smooth control of the brakes.

A branch conduit 29 leads from the conduit 23 to a brake application control unit 34, to be more fully described hereinafter and which normally connects the said conduit 29 by way of a conduit 30 to a chamber 35 in each of the cylinders 17 in which the liquid pressure generated by the pump 19 acts on the plunger 16 in opposition to the spring 18 to hold the wedge 15 in a position in which it does not expand the brake shoes 11. The said unit 34 also connects to the pump 19 a second liquid pressure accumulator 36 for a purpose hereinafter described. The plunger 16, acting in the cylinder 17 constitutes a fluid pressure responsive device enabling the brakes to be applied by the spring 18.

A return conduit 37 leads from the brake application control unit 34 to the reservoir 21, and a manual control lever for the said unit is provided at 38. As will appear from the subsequent description of the unit 34, suitable actuation of the manual control lever 38 permits escape of liquid from the chambers 35 to the reservoir 21, allowing the springs 18, through the wedges 15, to apply the brakes 10.

Figure 2:
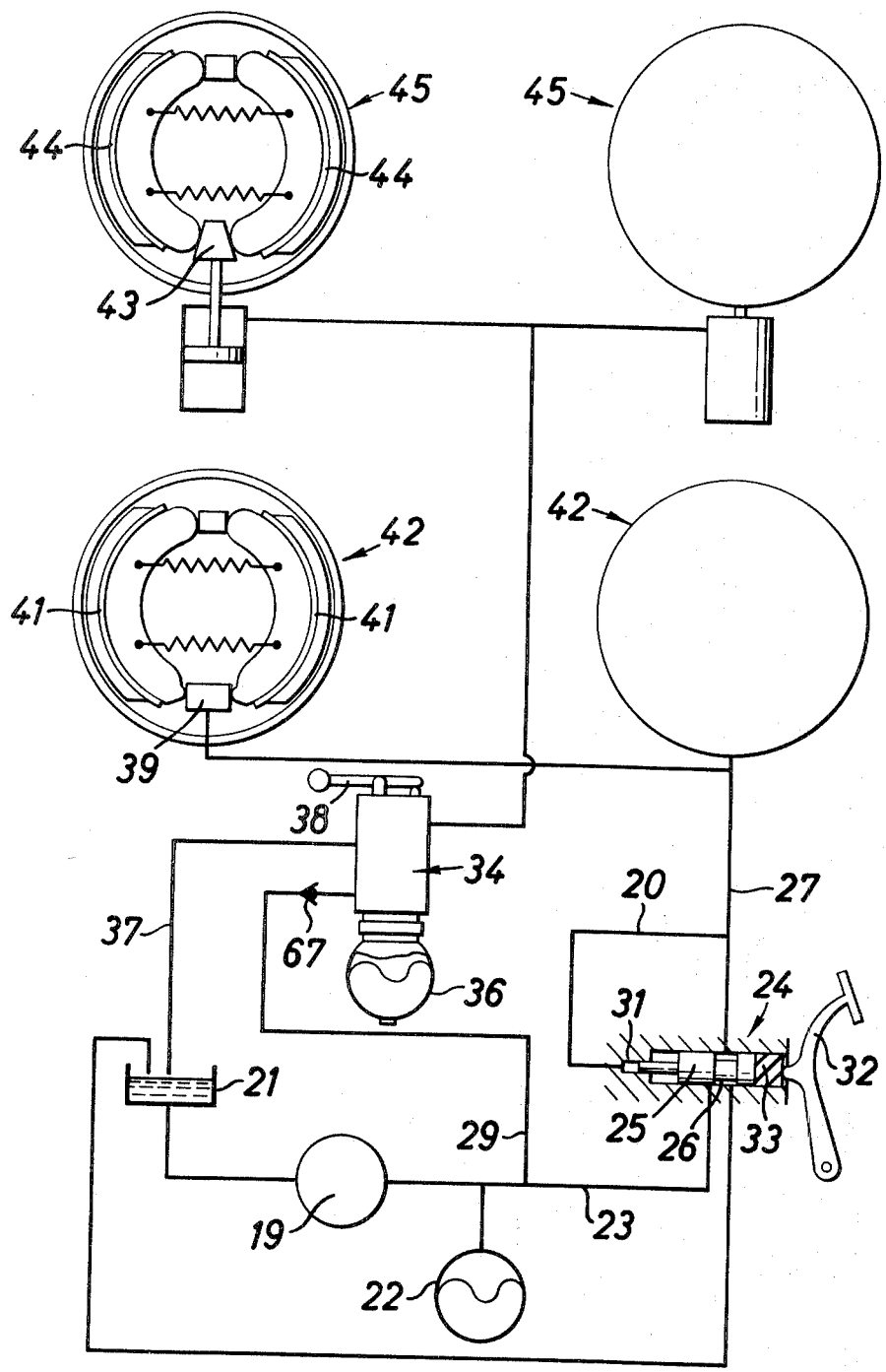
FIG. 2 is a similar diagram showing another arrangement of braking system according to the invention.

As shown in FIG. 2, wheel cylinders 39 to which the supply of pressure is controlled by the pedal-operated valve 24 may operate the shoes 41 of brakes 42 on one pair of wheels of a vehicle, and wedge members 43 controlled in the same manner as the wedge members 15 shown in FIG. 1 may operate the shoes 44 of brakes 45 on other wheels of the vehicle.

Figure 3:
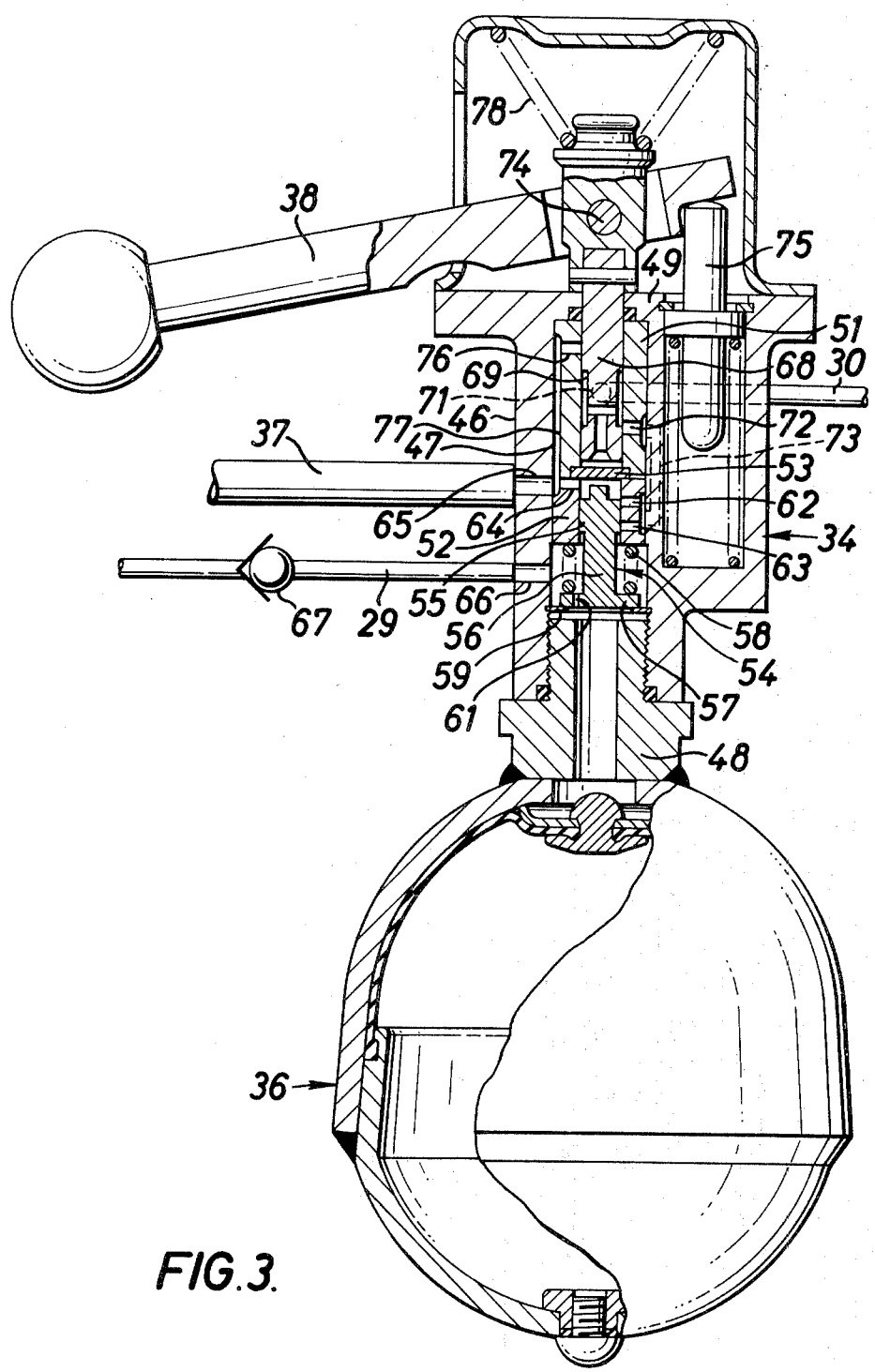
FIG. 3 is a sectional elevation of the brake application control unit shown diagrammatically in FIGS. 1 and 2.

Referring now to FIG. 3 of the drawings, the brake application control unit 34 comprises a body 46 formed with a through bore 47 into one end of which is fitted a screw-threaded tubular plug 48 supporting the liquid pressure accumulator 36.

The other end of the bore 47 is partly closed by an end wall 49 against the inner face of which abuts one end of a first bush 51 fitting closely in the bore 47, a second bush 52 being arranged end-to-end with the first bush 51 and terminating at a position spaced from the inner end of the plug 48. A transverse partition 53 at the junction of the two bushes 51 and 52 separates their bores one from the other.

Slidable in the bore of the second bush 52 is a first valve plunger 54 having a land portion 55 which fits slidably in that bush, a reduced portion 56 extending towards the end plug 48 in the bore, and a flange 57 which lies in the space between the second bush 52 and the plug 48. A compression spring 58 acts between the said flange 57 and the end of the second bush 52 to urge the said first plunger 54 towards the end plug 48, the movement of the valve plunger 54 towards the plug being limited by a stop ring 59, spaced from the end of the plug 48, and mounted in the valve body bore. A small orifice 61 is provided in the flange 57.

The land portion 55 of the first valve plunger 54 controls two axially spaced radial ports 62 and 63 in the second bush 52 so that, when the flange 57 on said valve plunger engages the stop ring 59, as shown in FIG. 3, the radial port 63 nearer to the end plug 48 is covered by the land, and the other port 62 is open to the bore of the second bush 52 adjacent the end of the said bore closed by the partition 53, which end of the said bore is connected by a radial slot 64 in the end of the bush 52 and a port 65 in the body 46 to the conduit 37 leading to the reservoir 21.

The part of the body bore 47 between the second bush 52 and the end plug 48 is connected at 66 to the conduit 29, so that liquid pressure is normally present in that part of the body bore whenever the engine of the vehicle on which the braking system is provided is running, and the small orifice 61 in the flange of the first valve plunger 54 provides communication, when the said flange is engaging the stop ring, between that part of the body bore and the liquid pressure accumulator 36. A non-return valve 67 is provided in the conduit 29 which prevents return of fluid from the unit 34 towards the pressure supply source.

A second valve plunger 68, slidable in the bore of the first bush 51 is formed with a peripheral groove 69 which, in the normal position of that plunger shown in FIG. 3, conencts two radial ports 71 and 72 in the wall of said first bush 51 one to the other, the radial port 72 being connected, by a passage 73 in the valve body 46, to both radial ports 62 and 63 in the second bush 52, and the port 71 being connected by the conduit 30 to the chambers 35 in the cylinders 18.

Thus, with the second valve plunger 68 in its normal position, liquid pressure from the pump 19 and accumulator 22 acts on the first valve plunger 54 to provide a thrust opposing the spring 58 acting on that plunger and passes through the orifice 61 in the flange 57 to load the liquid pressure accumulator 36. The said valve plunger 54 is moved to open the radial port 63, and close the radial port 62, so that liquid pressure is fed to the chambers 35 to oppose the brake applying springs 18 and prevent those springs from applying the brakes. Thus the wedges 15 are held in positions in which they do not apply the brakes.

In order that the springs 18 may be used to apply the brakes through the wedges 15, for example for parking purposes, the second valve plunger 68 is arranged to be operated by manual or other operator operated means to connect the chambers 35 in the cylinders 17 to the reservoir 21. The said second valve plunger 68 extends through the end wall 49 of the valve body 46 and is pivotally connected at 74 to the manual control lever 38 one end of which abuts against a springloaded plunger 75 mounted in the valve body 46, and the other end of which serves as an operating handle.

Operation of the said handle, upwardly as shown in FIG. 3, moves the second valve plunger 68 away from the partition 53 at the junction of the two bushes 51, 52, the said movement of that plunger 68 bringing the radial port 72 connected to the radial ports 62 and 63 in the bush 52 out of register with the peripheral groove 69 and causing that groove to communicate with a drain port 76 in the sleeve 51, which drain port is connected by an external longitudinal groove 77 in the said bush, to the port 65 and so to the reservoir 21. Liquid pressure is thus released from the chambers 35 and the brakes are applied by the springs 18.

The second valve plunger 68 is urged towards its normal position by a spring 78, and a ratchet or similar means (not shown) may be provided to hold the lever 38 in the position which it occupies when the brakes are applied for parking. The spring loaded plunger 75 acting on the lever 38 is provided to permit a greater movement of the lever than is necessary to effect the required movement of the second valve plunger 68.

The constantly acting applying force, instead of being provided by mechanical springs, may be provided by stored compressed gas.

If the main fluid pressure supply source for the braking system fails, the non-return valve 67 prevents loss of fluid pressure from the accumulator 36, and pressure is maintained in the chambers 35 to prevent the springs 18 from automatically applying the brakes. If, after such failure, the brakes are applied several times by operation of the lever 38, the pressure stored in the accumulator 36 is dissipated until the spring 58 overcomes that pressure and moves the valve plunger 54 to connect the chambers 35 to drain through the port 62, thus preventing the spring application of the brakes from being released.

It will be evident that leakage of fluid from the brake application control unit or the conduits connecting it to the chambers 35 will result in immediate application of the brakes by the springs 18.

I claim:

1. For use with a vehicle braking system including a source of fluid pressure at which fluid pressure is constantly available when the vehicle is in operation, at least one motor cylinder operable by pressure from said source to apply brakes on at least one wheel of the vehicle, control valve means for connecting the said source of pressure to the motor cylinder when application of the brakes is required, and means providing a constantly acting force tending to apply the same or other brakes on wheels of the vehicle, the improvement comprising a control unit with a valve having a housing having a first external connection for connection to a drain, a second external connection for connection to a pressure source, a third external connection for connection to a pressure responsive device, a first valve in said housing including a plunger with a spring urging it toward a second position to close off communication between said second external connection connected to said pressure source and said third external connection, said pressure source normally maintaining said first valve in a first position to permit communication between said second and third connections to supply fluid pressure against the constantly acting force tending to apply the brakes, a second valve in said housing disposed between said second pressure source connection and said third connection including a plunger with a spring normally urging said plunger to first a position in which said second and third connections are out of communication with each other, a manually operable valve means in said housing operatively connected to said second valve to move said second valve to a second position to communicate said first connection with said third connection to drain fluid from said third connection, and a fluid pressure storage device in communication with said housing and in communication with said second connection and third connections to operate the pressure response device when pressure from said second connection is removable, said second connection having a non-return valve therein upstream of said pressure storage device.

2. The control unit of claim 1 wherein said manually operable valve includes a lever pivotally connected to said second valve, and a spring loaded plunger acting on said lever.

* * * * *